United States Patent Office 3,845,013

Patented Oct. 29, 1974

3,845,013
STABILIZATION OF ETHYLENE POLYMERS

Michael Robin, Colonia, N.J., and Sheldon R. Schulte, Columbus, Ohio, assignors to Ashland Oil, Inc., Ashland, Ky.

No Drawing. Filed May 8, 1972, Ser. No. 251,169
The term of this patent subsequent to Oct. 22, 1991, has been disclaimed
Int. Cl. C08f *45/58;* C08g *51/58*
U.S. Cl. 260—45.95 C 26 Claims

ABSTRACT OF THE DISCLOSURE

Polymers of ethylene of increased stability against oxidative deterioration containing a compound of the general formula:

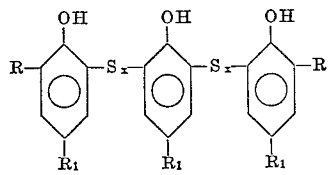

wherein $x$ is an integer from 1 to 2, each R individually is an alkyl radical of 1–9 carbon atoms, and each $R_1$ individually is an alkyl radical of 1–4 carbon atoms, provided that at least one $R_1$ and $CH_3$.

BACKGROUND OF THE INVENTION

The present invention relates to the stabilization of ethylene polymers against oxidative deterioration. More particularly, the present invention is concerned with polymers of ethylene of increased stability against oxidative degradation which contain certain tris phenol sulfides.

Ethylene polymers may be formed into many useful articles. However, such polymers are susceptible, in varying degrees, to degradation caused by exposure to light. Severe degradation occurs when the polymer, is exposed to light in the ultraviolet portion of the spectrum. In addition, the unstabilized polymer is degraded by oxygen, especially when subjected to elevated temperature and/or mechanical working. Degradation apparently results from free radical formation, which formation is promoted by mechanical work, heat, ultraviolet light, and impurities such as metals and metal compounds.

The free radicals which are formed undergo further chemical reactions, resulting in undesirable chemical and physical transformations in the polymer. Thus, after a variable period of time, there is a premature deterioration of the polymer. Such deterioration may result in a loss in tensile strength, molecular weight and other desirable properties such as pliability and impact strength. In addition, discoloration and embrittlement of the polymer may be observed.

Numerous materials have been suggested as antioxidant additives for such polymers but various of these materials are not altogether satisfactory either in terms of their versatility and/or performance under stringent conditions of temperature and mechanical working, and particularly at temperatures of 250° F. and higher. Accordingly, the search for improved methods of protecting ethylene polymers proceeds quite actively.

Those skilled in the art have long recognized the empirical nature of antioxidant technology and the extreme difficulty of predicting whether an ethylene polymer will be effectively stabilized against oxidation by the incorporation of a given compound. Whether any commercially worthwhile level of oxidation protecting is attained and the extent thereof depends both upon the nature of the material to be protected and the exact structure of the antioxidant compound, and is most frequently unpredictable. Thus, Downey and Zerbe, in U.S. Pat. 2,670,382, observed that "it is now known that the number, size, position and kind of substituted group [in the antioxidant compound] exerts a profound influence on the antioxidant properties of the substituted phenol sulfides." Moreover, the empiric nature of the art of stabilizing polyolefins with phenolic stabilizers was recognized by the Court of Customs and Patent Appeals in *In re Thompson,* 169 USPQ 35, 37.

Rosen and R. Thomas, in U.S. Pat. 2,244,021, suggest that various polymers such as polyisobutylene, hydrogenated rubber and hydrogenated polymers of diolefins such as isoprene and butadiene can be stabilized against depolymerization by incorporating therein certain bis phenol sulfides, compounds including two phenolic nuclei bridged or connected to one another by a sulfur linkage containing at least one sulfur atom such as 4,4'-thiobis(2-amylphenol).

Tris phenol sulfides, compounds including three phenolic nuclei linked by two sulfur brides such as

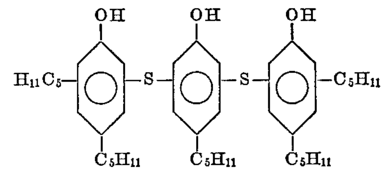

and metal salts of such compounds, were discussed by Cook and W. Thomas. They disclosed in U.S. Pat. 2,336,074 that such compounds would stabilize lubricating oils against oxidation and sludge formation. Later, Downey et al., in U.S. Pat. 2,670,382, suggested that oxidation inhibitors for rubbery polymers could be produced by reacting two molecular equivalents of a 3,6-di-substituted phenol with one molecular equivalent of sulfur dichloride to produce a bis phenol sulfide such as one having the following structure:

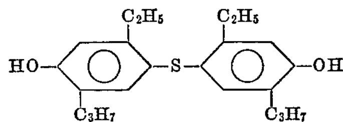

Downey et al. reported that attempts to increase the sulfur content of the phenol sulfide produced composite reaction products including some compounds which contained more than two phenol nuclei linked together by sulfur atoms. Downey et al. seem to indicate that the presence of compounds containing more than two phenol nuclei caused some loss in the antioxidant properties of the composite reaction products as compared with the bis phenol sulfide in the rubbery polymers.

Apparently in conformity with the negative teachings of Downey et al., the rather comprehensive disclosure of Salyer and Kenyon in U.S. Pat. 2,985,617 relative to phenol sulfide thermal processing co-stabilizers for Ziegler polyethylene and polypropylene fails to discuss a single tris phenol sulfide. Also, although Bailey's U.S. Pat. 3,067,259 relative to alkoxy substituted phenolic stabilizers for polyethylene and polypropylene includes a general formula for trinuclear phenols embracing a myriad of methylene, ethylidene, isopropylidene and sulfur bridged tris phenols, not one specific tris phenol sulfide compound is discussed.

More recently, in U.S. Pat. 3,423,389, Wheelus has reported that bis and higher phenol sulfides are helpful in improving the color and color retention of tall oils and rosin compounds during bleaching. Due to the differences which exist between these compounds and the lubricating oils and polymers discussed by the previously mentioned references, the relationship, if any, between the work of Wheelus and the problems of polyethylene stabilization is not apparent.

Therefore, an object of this invention is to increase the stabilization of ethylene polymers against oxidation. A further object is to provide polymers of ethylene capable of being heat formed into film, sheeting and molded articles characterized by improved resistance to oxidative deterioration during processing at elevated temperatures. A further object of this invention is to provide ethylene polymers which are stabilized against oxidative deterioration after processing at elevated temperatures.

BRIEF SUMMARY OF THE INVENTION

The present invention is directed to an ethylene polymer composition of increased stability against oxidative degradation containing an ethylene polymer and an effective stabilizing amount of compound of the general formula:

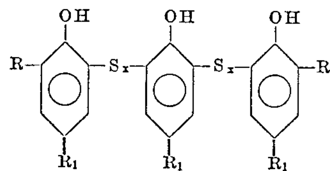

wherein $x$ is an integer from 1–2 and each R individually is an alkyl radical of 1–9 carbon atoms and each $R_1$ individually is an alkyl radical of 1–4 carbon atoms provided that at least one $R_1$ is $CH_3$.

The present invention is further concerned with increasing the stability of the ethylene polymer against degradation caused by thermal processing which comprises incorporating in said polymer prior to completion of the thermal processing an effective stabilizing amount of compound of the general formula:

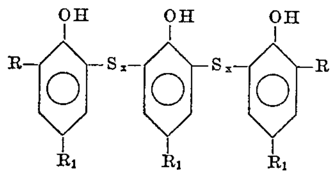

wherein $x$, R, and $R_1$ have the same meanings as defined above.

DESCRIPTION OF PREFERRED EMBODIMENTS

The ethylene polymers to which the present invention is applicable are solid homopolymers of ethylene, and solid copolymers of ethylene and one or more ethylenically unsaturated copolymerizable monomers. Generally the ethylene polymers contain at least about 85% by weight of ethylene units. Some examples of suitable ethylenically unsaturated co-monomers which are copolymerizable with ethylene include styrene, vinyl chloride, vinyl acetate, vinylidene chloride, vinylidene chlorofluoride, methylmethacrylate, butadiene, isoprene, propylene, butylene, 3-ethylbutene-1, 4-methylpentene-1, 4, 4-dimethylpentene-1, 3-methylpentene-1, and the like. Thus, any ethylene polymer within the foregoing definition or mixtures of such polymers may be employed, whether it includes a molecular structure which is crystalline, or amorphous or both.

The polymers of ethylene which are employed may, for example, be similar to the essentially linear and unbranched polymers of relatively high molecular weight which are obtained under relatively low pressures of 1–100 atmospheres using such catalysts to polymerize the ethylene as mixtures of strong reducing agents and compounds of Group IVB, VB, and VIB metals of the periodic system, chromium oxide on silicated alumina, hexavalent molybdenum compounds and charcoal supported nickel-cobalt. Ethylene polymers may also be prepared with peroxide or azo catalysts and water or organic liquid reaction media with moderately high pressures, for example, 300–700 atmospheres. The polymers of ethylene may also be similar to those which are obtained by polymerizing ethylene in a basic aqueous medium and in the presence of polymerization-favoring quantities of oxygen under higher pressures in the range of 500–3,000 and preferably 1,000–2,700 atmospheres at temperatures between 150 and 275° C.

Ethylene polymers prepared by the processes described above have melting points of from 100° C. to 300° C., a tensile strength of from 1,000 to 10,000 lbs. per square inch and a molecular weight of from 6,000 to 3,000,000 and preferably 20,000 to 1,000,000. Usually a mixture of crystalline and amorphous polymer is obtained. If desired, the amorphous polymer can be separated from the crystalline polymer by contacting a mixture thereof with a hydrocarbon solvent, such as isooctane or n-heptane at an elevated temperature. The amorphous polymer is substantially soluble under these conditions, whereas the crystalline polymer is substantially insoluble.

In accordance with the present invention, a polymer of ethylene as described above has incorporated therein a tris phenol sulfide of the general formula:

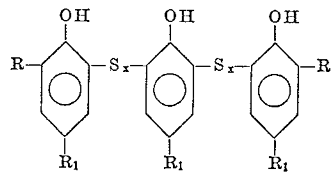

wherein $x$ is an integer of from 1 to 2, each R individually is an alkyl radical of 1–9 carbon atoms, and each $R_1$ individually is an alkyl radical of 1–4 carbon atoms, provided that at least one $R_1$ is $CH_3$. $x$ in the above formula is preferably equal to 1.

Each R individually is preferably an alkyl radical containing 4 to 9 carbon atoms, and most preferably is tert. butyl or nonyl. It is also preferred that the $R_1$ substituent on the middle phenolic radical is $CH_3$.

The tris phenol sulfides in accordance with the above formula are employed in a small but effective amount. The amount is sufficient to provide at least some protection to the polymer against the effects of thermal processing. Such small but protective amount is usually within the range of about 0.005 to about 5 weight percent, based upon the weight of the polymer and preferably from about 0.01 to about 0.5 weight percent based upon the weight of the polymer.

The tris phenol sulfides encompassed within the above formula are conveniently obtained by the action of sulfur monochloride ($S_2Cl_2$) or sulfur dichloride ($SCl_2$) on a 4-alkylphenol and a 2,4-dialkylphenol in a suitable solvent medium. When convenient or desirable, other methods of synthesis may be used, and it is to be understood that this invention is not limited to any particular method of synthesis but pertains broadly to the use of the materials described. Also, while the compounds to be used in accordance with the present invention have been described with the aid of a structural formula, it will be appreciated that some if not all of the available production methods may produce minor quantities of other molecules derived from the starting materials which do not correspond exactly with the structural formula. Usually the quantity of such impurities is less than about 10% and most often less than about 5% by weight of the desired tris phenol sulfide. These other materials may or may not be separated from the depicted tris phenol sulfide before their use in the invention, and it should therefore be understood that the claims appended hereto are intended to cover the use of the essentially pure tris phenol sulfide compound as well as composite reaction products in which they are the major component(s). The weight of those other compounds in the composite reaction products which are effective in stabilizing the polyolefins may be counted with the weight of the tris phenol sulfide compound of the above formula in determining the amount of said compound which is present.

The present invention is of particular importance in increasing the stability of the ethylene polymer against degradation caused by thermal processing whereby the sulfide is incorporated in the polymer prior to completion of the thermal processing and preferably is incorporated while the polymer is still at about room temperature. The sulfides employed according to the present invention are preferably utilized for protecting ethylene polymers during thermal processing at temperatures of about 250° F. to about 450° F. and preferably at temperatures of about 300 to about 350° F.

There are numerous methods that can be used to treat ethylene polymers with tris phenol sulfides in accordance with the invention. One method is to incorporate the tris phenol sulfide during cold milling of the polymer, i.e., during the treatment of the polymer on conventional rubber mills without the addition of external heat. In order to obtain maximum dispersion of the tris phenol sulfide in the polymer, it is preferred that the phenol sulfide be dissolved in suitable solvent, e.g., methanol, ethanol, benzene, toluene, and that the resulting solution be added to the polymer on the rolls. Ordinarily, a volatile solvent is used which will readily evaporate, although if the intended use of the polymer permits or renders desirable the incorporation of a high molecular weight diluent for the purpose of plasticizing or otherwise affecting the polymer, this may be done. The tris phenol sulfide can also be incorporated in the polymer in other mixing devices, for example, Banbury mixers and extruders. The polymer can be dissolved in a solvent, for example, hot aromatic hydrocarbons such as benzene or xylene, followed by mixing the tris phenol sulfide in proper proportions with the polymer solution and the use of said solution for casting films, spinning fibers and similar operations that are well known to the art, wherein the solvent is evaporated away from the polymer, resulting in the formation of films, fibers, monofilaments and the like. Moreover, finely divided particles of the polymer may be slurried in a solvent solution of the tris phenol sulfide compound, following which the solvent is evaporated to leave the particles of polymer intimately admixed with the tris phenol sulfide compound.

It will be understood that in any of these methods of treating the polymer with the phenol sulfide, during such treating, or before or after, conventional fillers, dyes, pigments, modifying polymers, and the like can be admixed with the ethylene polymers described above.

The following non-limiting examples are provided to further illustrate the present invention. All parts are by weight unless the contrary is stated.

EXAMPLE 1

To a glass reaction vessel equipped with an agitator, a thermometer, a condenser to which is connected a means for scrubbing evolved HCl are added with agitation 750 parts toluene, 216 parts paracresol, and 656 parts of 2-t-butyl-4-methylphenol. While maintaining the temperature between 20 and 30° C., 424 parts of sulfur dichloride are added with agitation over a period of approximately 2–3 hours, during which HCl is evolved. Upon completion of the addition, the reaction mixture is agitated at room temperature for an additional hour. The reaction mixture is then heated to 40° C. and is held at that temperature for 1 to 2 hours to insure completion of the reaction as evidenced by cessation of HCl evolution. 750 parts of water are added to the reaction mixture with vigorous agitation. The agitation is stopped and the mixture is transferred to a separating funnel. The mixture stratifies into a lower aqueous layer and upper organic layer. The lower aqueous layer is removed and discarded. To the remaining organic layer are added with agitation 500 parts of water and 50 parts of a 10% aqueous disodium hydrogen phosphate solution. The agitation is continued until the organic layer, water, and phosphate are thoroughly mixed. The agitation is then stopped and the mixture upon standing stratifies into a lower aqueous layer and an upper organic layer, which is now essentially neutral. The aqueous layer is removed and discarded. The remaining organic layer is washed twice with 500 parts of water and the residual water and solvent are removed by vacuum distillation. 985 parts of α,α'-thio(3-t-butyl-2-hydroxy-5-methylphenyl)p-cresol are obtained.

EXAMPLE 2

The above procedure is repeated except that one mole of sulfur monochloride is substituted for each mole of sulfur dichloride. 1,100 parts of α,α'-dithio(3-t-butyl-2-hydroxy-5-methylphenyl)p-cresol are obtained.

EXAMPLE 3

To a glass reaction vessel equipped with an agitator, a thermometer, a condenser to which is connected a means for scrubbing evolved HCl are added with agitation 1,175 parts toluene, 270 parts paracresol, and 670 part of 2-nonyl-4-methylphenol. While maintaining the temperature between 20 and 30° C., 530 parts of sulfur dichloride are added with agitation over a period of approximately 2–3 hours, during which HCl is evolved. Upon completion of the addition, the reaction mixture is agitated at room temperature for an additional hour. The reaction mixture is then heated to 40° C. and is held at that temperature for 1 to 2 hours to insure completion of the reaction as evidenced by cessation of HCl evolution. 1,500 parts of water are added to the reaction mixture with vigorous agitation. The agitation is stopped and the mixture is transferred to a separating funnel. The mixture stratifies into a lower aqueous layer and upper organic layer. The lower aqueous layer is removed and discarded. To the remaining organic layer are added with agitation 500 parts of water and 50 parts of a 10% aqueous disodium hydrogen phosphate solution. The agitation is continued until the organic layer, water, and phosphate are thoroughly mixed. The agitation is then stopped and the mixture upon standing stratifies into a lower aqueous layer and an upper organic layer, which is now essentially neutral. The aqueous layer is removed and discarded. The remaining organic layer is washed twice with 500 parts of water and the residual water and solvent are removed by vacuum distillation. 930 parts of α,α'-thio(3 - nonyl - 2 - hydroxy-5-methylphenyl)-p-cresol are obtained.

EXAMPLE 4

To a glass reaction vessel equipped with an agitator, a thermometer, a condenser to which is connected a means for scrubbing evolved HCl are added with agitation 1,175 parts toluene, 216 parts paracresol, and 488 parts of 2,4-dimethylphenol. While maintaining the temperature between 20 and 30° C., 424 parts of sulfur dichloride are added with agitation over a period of approximately 2–3 hours, during which HCl is evolved. Upon completion of the addition, the reaction mixture is agitated at room temperature for an additional hour. The reaction mixture is then heated to 40° C. and is held at that temperature for 1 to 2 hours to insure completion of the reaction as evidenced by cessation of HCl evolution. 1,500 parts of water are added to the reaction mixture with vigorous agitation. The agitation is stopped and the mixture is transferred to a separating funnel. The mixture stratifies into a lower aqueous layer and upper organic layer. The lower aqueous layer is removed and discarded. To the remaining organic layer are added with agitation 500 parts of water and 50 parts of a 10% aqueous disodium hydrogen phosphate solution. The agitation is continued until the organic layer, water, and phosphate are thoroughly mixed. The agitation is then stopped and the mixture upon standing stratifies into a lower aqueous layer and an upper organic layer, which is now essentially neutral. The aqueous layer is removed and discarded. The remaining organic layer is washed twice with 500 parts of water and the residual water and solvent are removed by vacuum distillation. 817 parts of α,α'-thio(3,5-dimethyl-2-hydroxyphenyl)-p-cresol are obtained.

EXAMPLE 5

To a glass reaction vessel equipped with an agitator, a thermometer, a condenser to which is connected a means for scrubbing evolved HCl are added with agitation 1,525 parts toluene, 270 parts paracresol, and 1,030 parts of 2,4-di-t-butyphenol. While maintaining the temperature between 20 and 30° C., 515 parts of sulfur dichloride are added with agitation over a period of approximately 2–3 hours, during which HCl is evolved. Upon completion of the addition, the reaction mixture is agitated at room temperature for an additional hour. The reaction mixture is then heated to 40° C. and is held at that temperature for 1 to 2 hours to insure completion of the reaction as evidenced by cessation of HCl evolution. 1,500 parts of water are added to the reaction mixture with vigorous agitation. The agitation is stopped and the mixture is transferred to a separating funnel. The mixture stratifies into a lower aqueous layer and upper organic layer. The lower aqueous layer is removed and discarded. To the remaining organic layer are added with agitation 500 parts of water and 50 parts of a 10% aqueous disodium hydrogen phosphate solution. The agitation is continued until the organic layer, water, and phosphate are thoroughly mixed. The agitation is then stopped and the mixture upon standing stratifies into a lower aqueous layer and an upper organic layer, which is now essentially neutral. The aqueous layer is removed and discarded. The remaining organic layer is washed twice with 500 parts of water and the residual water and solvent are removed by vacuum distillation. 1,000 parts of α,α'-thio(3,5-di-t-butyl-2-hydroxyphenyl)-p-cresol are obtained.

EXAMPLE 6

The product prepared according to Example 1 is admixed with a polyethylene of 0.960 density and 300,000 molecular weight available under the trade designation USI Petrothene in a steel container and the mixture is extruded twice at 300° F. The concentration of the product prepared according to Example 1 is then adjusted to 0.1% by weight of the polymer by the addition of more of the polyethylene and the mixture is again extruded twice under the same conditions. The resulting polyethylene composition is then pressed into a 6–6.5 mil film at 310° F. and 1280 p.s.i. on a ten-inch hydraulic ram press. Likewise, there are prepared according to the above-described method, a film of the same polyethylene without any antioxidant and films of the same polyethylene containing 0.1% of the following:

α,α'-thio(3-t-butyl-2-hydroxy-5-methylphenyl)-p-methoxyphenol;
2,6-bis(3-t-butyl-2-hydroxy-5-methylbenzyl)-4-methylphenol;
2,2'-thiobis(6-t-butyl-4-methylphenol);
2,2'-methylenebis(6-t-bbutyl-4-methylphenol);
α,α'-thio(3,5-dimethyl-2-hydroxyphenyl)-p-cresol;
α,α'-thio(3-methoxy-2-hydroxy-5-methylphenyl)-p-cresol;
2,6-bis(2-hydroxy-3-methoxy-5-methylbenzyl)-4-methylphenol; and
α,α'-thio(3-nonyl-2-hydroxy-5-methylphenyl)-p-cresol.

EXAMPLE 7

The polyethylene films produced in Example 6 are simultaneously introduced into a forced draft over which is continuously maintained at 125°±1° C. The absorbence of the films in the carbonyl region, 5.8 microns of the IR spectrum is then recorded periodically. When absorbence reaches 94% the sample is considered to be "oxidized," and the time of exposure to reach this point is recorded in the table below:

| | Additive | Amount, percent | Time in hrs. to reach 94% absorbence |
|---|---|---|---|
| (A) | 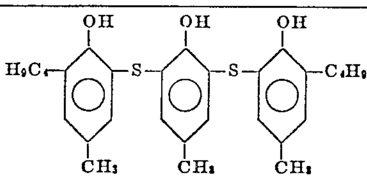 α,α'-thio(3-t-butyl-2-hydroxy-5-methylphenyl)-p-cresol (Product prepared according to Example 1). | 0.1 | 1,661 |
| (B) | None | | 59 |
| (C) | 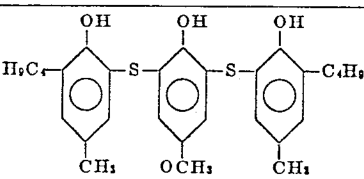 α,α'-thio(3-t-butyl-2-hydroxy-5-methylphenyl)-p-methoxyphenol. | 0.1 | 1,620 |
| (D) | 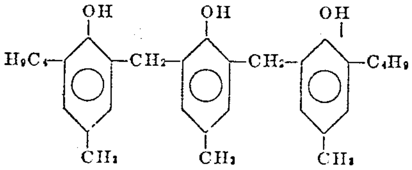 2,6-bis(3-t-butyl-2-hydroxy-5-methylbenzyl)-4-methylphenol. | 0.1 | 887 |

TABLE—Continued

| | Additive | Amount, percent | Time in hrs. to reach 94% absorbence |
|---|---|---|---|
| (E) | 2,2′-thiobis(6-t-butyl-4-methylphenol). | 0.1 | 132 |
| (F) | 2,2′-methylenebis(6-t-butyl-4-methylphenol). | 0.1 | 170 |
| (G) | α,α′-thio(3,5-dimethyl-2-hydroxyphenyl)-p-cresol (Product prepared according to Example 4). | 0.1 | 1,495 |
| (H) | α,α′-thio(3-methoxy-2-hydroxy-5-methylphenyl)-p-cresol. | 0.1 | 936 |
| (I) | 2,6-bis(2-hydroxy-3-methoxy-5-methylbenzyl)-4-phenol. | 0.1 | 886 |
| (J) | α,α′-thio(3-nonyl-2-hydroxy-5-methylphenyl)-p-cresol (Product prepared according to Example 3). | 0.1 | 1,800 |
| (K) | α,α′-thio(3,5-di-t-butyl-2-hydroxyphenyl)-4-t-butylphenol. | 0.1 | 864 |

The above example demonstrates the increased stabilization obtained from the materials employed in the present invention as compared to those outside the scope of the present invention. For instance, a comparison of Example 7(A) (which is within the scope of the present invention) with Example 7(C) demonstrates the unexpected excellent stabilization with trisphenol sulfides which do not contain an alkoxy substituent as required in the Bailey patent. In addition, a comparison of Example 7(A) with Example 7(D) demonstrates that the presence of sulfur bridges between the phenolic nuclei provides for much more effective stabilization as compared to similar materials wherein the sulfur bridges are replaced with methylene bridges. In addition, a comparison of Examples 7(E) and 7(F) demonstrates that the substitution of a sulfur bridge between phenolic nuclei for a methylene bridge does not necessarily provide improved stabilization.

A comparison of Example 7(A) with Example 7(E) shows that the presence of three phenolic nuclei provides greater improved stabilization as compared to the presence of only two phenolic nuclei in the compound. In addition, Example 7(J) shows the excellent results obtained when a nonyl substituent is present ortho to the hydroxyl groups of the two end phenolic radicals. Moreover, Example 7(K) illustrates the inferior results obtained from a material similar to those of the present invention except that the material does not contain a methyl group para to the hydroxy group of any of the phenolic radicals.

The following example is provided to further demonstrate the unpredictability in selecting antioxidants. This example shows that some of the above antioxidants within the scope of the present invention do not provide the same type of results when incorporated in a similar material such as polypropylene as are obtained with the ethylene polymers. Some of the materials within the scope of this invention; however, provide good stabilization when incorporated in polypropylene.

EXAMPLE 8

The product prepared according to Example 3 is admixed with a polypropylene of 0.90 density and approximately 325,000 molecular weight and is available under the trade designation Pro-Fax 6501 from Hercules in a steel container and the mixture is extruded twice at 380° F. The resulting polypropylene composition containing 0.5% by weight of the product prepared according to Example 3 is then pressed into a 6–6.5 mil film at 350° F. and 1280 p.s.i. on a 10" hydraulic ram press. Likewise, there are prepared according to the above procedure a film of the same polypropylene without any antioxidant and films of the same polypropylene containing 0.5% of the following:

α,α'-thio(3-t-butyl-2-hydroxy-5-methylphenyl)-p-methylphenol;
2,6-bis(3-t-butyl-2-hydroxy-5-methylbenzyl)-4-methylphenol;
2,2'-thiobis(6-t-butyl-4-methylphenol);
α,α'-thio(3,5-dimethyl-2-hydroxyphenyl)-p-cresol;
α,α'-thio(3-methoxy-2-hydroxy-5-methylphenyl)-p-cresol;
α,α'-thio(3-t-butyl-2-hydroxy-5-methylphenyl)-p-cresol.

The resulting films are then subjecterd to 150±1° C. in a forced draft oven. The absorbance in the carbonyl region of the IR Spectrum (5.8 microns) is then recorded after periods of exposure. When absorbance reaches 94% the sample is considered to be "oxidized," and the time of exposure to reach this point is recorded in the table below:

| | Additive | Amount, percent | Time in hrs. to reach 94% absorbence |
|---|---|---|---|
| (A) | 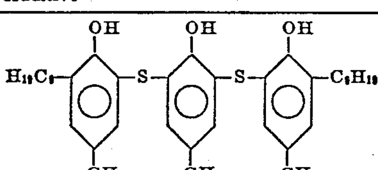 α, α'-thio(3-nonyl-2-hydroxy-5-methylphenyl)-p-cresol (Product prepared according to Example 3). | 0.5 | 15 |
| (B) | None | | 8 |
| (C) | 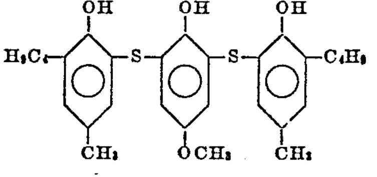 α, α'-thio(3-t-butyl-2-hydroxy-5-methylphenyl)-p-methoxyphenol. | 0.5 | 91 |
| (D) | 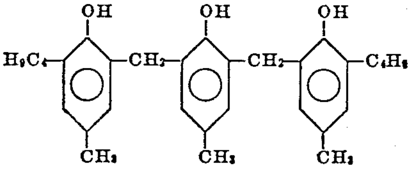 2,6-bis(3-t-butyl-2-hydroxy-5-methylbenzyl)-4-methylphenol. | 0.5 | 118 |
| (E) | 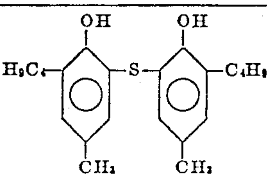 2,2'-thiobis(6-t-butyl-4-methylphenol). | 0.5 | 15 |

TABLE—Continued

| Additive | Amount, percent | Time in hrs. to reach 94% absorbence |
|---|---|---|
| (F) 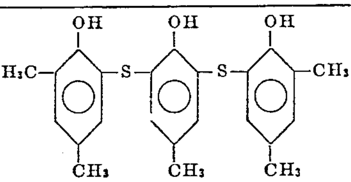 α,α'-thio(3,5-dimethyl-2-hydroxyphenyl)-p-cresol (Product prepared according to Example 4). | 0.5 | 89 |
| (G) 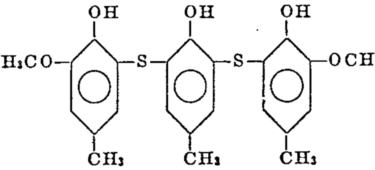 α,α'-thio(3-methoxy-2-hydroxy-5-methylphenyl)-p-cresol. | 0.5 | 168 |
| (H) 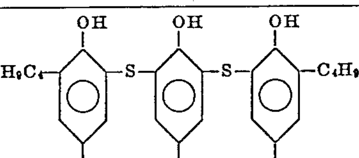 α,α'-thio(3-t-butyl-2-hydroxy-5-methylphenyl)-p-cresol (Product prepared according to Example 1). | 0.5 | 180 |

The above example points out that a material which is an effective antioxidant with one polymer is not necessarily effective when employed with another polymer. For instance, a comparison of Example 8(A) and Example 8(E) and Example 8(B) shows that α,α'-thio(3-nonyl-2-hydroxy-5-methylphenyl)-p-cresol which demonstrated the best results when added to polyethylene is no better than 2,2'-thiobis(6-t-butyl-4-methylphenol) and is only slightly better than the polypropylene without any antioxidant. In addition, a comparison of Example 8(A) with Example 8(D) shows that the presence of sulfur bridges for methylene bridges do not necessarily provide improved stabilization. In addition, a comparison of Examples 8(F) and 8(G) demonstrates that the presence of alkoxy groups in place of alkyl groups does not necessarily decrease the stabilization. On the other hand, a comparison of Examples 8(H) and 8(C) indicates that materials within the scope of the present invention are also effective in polypropylene. Certain materials other than α,α'-thio(3-t-butyl-2-hydroxy-5-methylphenyl)-p-cresol within the scope of this invention such as α,α'-thio-(3,5-di-t-butyl-2-hydroxyphenyl)-p-cresol; however, are also effective in polymers of propylene.

EXAMPLE 9

The product prepared according to Example 1 is admixed with a polyethylene of 0.960 density and 300,000 molecular weight available under the trade designation Hi-Fax from Hercules in a steel container and the mixture is extruded twice at 300° F. The concentration of the product prepared according to Example 1 is then adjusted to 0.1% by weight of the polymer by the addition of more of the polyethylene and the mixture is again extruded twice under the same conditions. The resulting polyethylene composition is then pressed into a 6–6.5 mil film at 310° F. and 1280 p.s.i. on a ten-inch hydraulic ram press. Likewise, there are prepared according to the above-described method, a film of the same polyethylene without any antioxidant and films of the same polyethylene containing 0.1% of the following:

α,α'-thio(3-t-butyl-2-hydroxy-5-methylphenyl)-p-methoxyphenol;
2,6-bis-(2-hydroxy-3'-tert.butyl-5'-methylbenzyl)-4-methylphenol;
2,2'-thiobis-[4-methyl-6-thio-(3-t-butyl-2-hydroxy-5-methylphenyl)-phenol];
α,α'-thio(3,5-di-t-butyl-2-hydroxyphenyl)-p-cresol;
α,α'-dithio(3-t-butyl-2-hydroxy-5-methylphenyl)-p-cresol;
α,α'-dithio(3-t-butyl-2-hydroxy-5-methylphenyl)-p-methoxyphenol;
2,2'-thiobis-[4-methyl-6-dithio-(3-t-butyl-2-hydroxy-5-methylphenyl)-phenol];

The polyethylene films produced above are introduced into a forced draft oven which is continuously maintained at 125°±1° C. The absorbence of the films in the carbonyl region, 5.8 microns of the IR spectrum, is then recorded periodically. When absorbence reaches 94% the sample is considered to be "oxidized," and the time of exposure to reach this point in the table below:

| Additive | Amount, percent | Time in hrs. to reach 94% absorbence |
|---|---|---|
| (A) 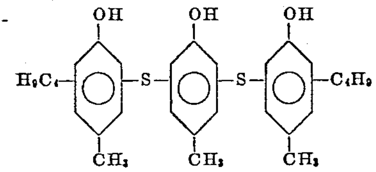 α,α'-thio(3-t-butyl-2-hydroxy-5-methylphenyl)-p-cresol (Product prepared according to Example 1). | 0.1 | 1,060 |

TABLE—Continued

| | Additive | Amount, percent | Time in hrs. to reach 94% absorbence |
|---|---|---|---|
| (B) | None | | 50 |
| (C) | 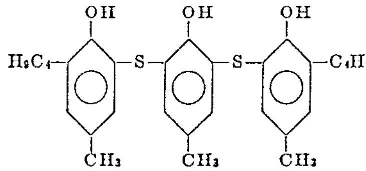 α α'-thio(3-t-butyl-2-hydroxy-5-methylphenyl)-p-methoxyphenol. | 0.1 | 425 |
| (D) | 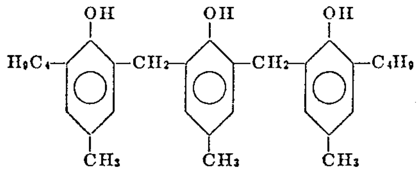 2,6-bis(3-t-butyl-2-hydroxy-5-methylbenzyl)-4-methylphenol. | 0.1 | 707 |
| (E) | 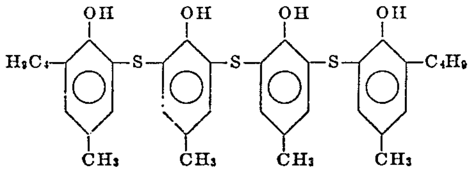 2,2'-thiobis-[4-methyl-6-thio(3-t-butyl-2-hydroxy-5-methylphenyl)-phenol]. | 0.1 | 527 |
| (F) | 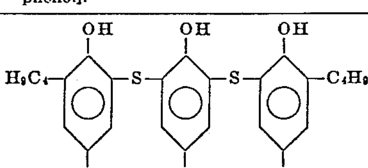 α,α'-thio(3,5-di-t-butyl-2-hydroxyphenyl)-p-cresol (Product prepared according to Example 5). | 0.1 | 1,097 |
| (G) | 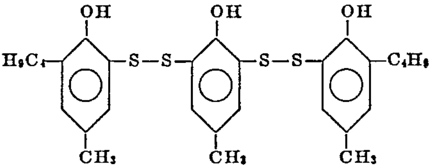 α,α'-dithio(3-t-butyl-2-hydroxy-5-methylphenyl)-p-cresol (Product prepared according to Example 2). | 0.1 | 548 |
| (H) | 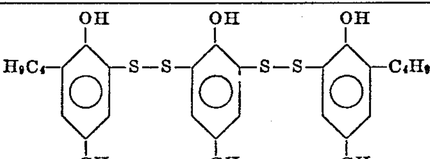 α,α'-dithio(3-t-butyl-2-hydroxy-5-methylphenyl)-p-methoxyphenol. | 0.1 | 435 |
| I) | 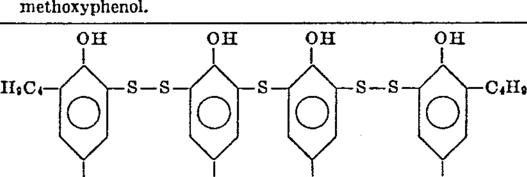 2,2'-thiobis-[4-methyl-6-dithio(3-t-butyl-2-hydroxy-5-methylphenyl)-phenol]. | 0.1 | 502 |

The above example further illustrates the improved stabilization obtained from the materials employed in the present invention. For instance, a comparison of Examples 9(A) and 9(F) with Example 9(C) and a comparison of Example 9(G) with 9(H) demonstrates the unexpected increased stabilization with trisphenol sulfides which do not contain an alkoxy substituent as required in the Bailey patent. In addition, a comparison of Example 9(A) with 9(D) demonstrates the importance of sulfur bridges instead of methylene bridges. Moreover, a comparison of Example 9(A) with Example 9(E) and a comparison of Example 9(G) with Example 9(I) demonstrate that increasing the number of phenolic nuclei does not necessarily improve the stabilization effect.

What is claimed is:

1. A polymer composition of increased stability against oxidative degradation comprising an ethylene polymer and an effective stabilizing amount of compound of the general formula:

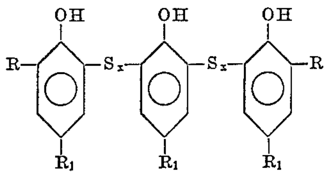

wherein $x$ is an integer of from 1 to 2 and each R individually is an alkyl radical of 1–9 carbon atoms, and each $R_1$ individually is an alkyl radical of 1–4 carbon atoms, provided that at least one $R_1$ is $CH_3$.

2. The composition of claim 1 wherein said ethylene polymer is polyethylene.

3. The composition of claim 1 wherein $x$ is 1.

4. The composition of claim 1 wherein R is an alkyl radical containing 4 to 9 carbon atoms.

5. The composition of claim 1 wherein R is tert.butyl.

6. The composition of claim 1 wherein R is nonyl.

7. The composition of claim 1 wherein the $R_1$ substituent on the middle phenolic nuclei is methyl.

8. The composition of claim 1 wherein each $R_1$ is methyl.

9. The composition of claim 1 wherein said compound is $\alpha,\alpha'$-thio(3-t-butyl-2-hydroxy-5-methylphenyl)-p-cresol.

10. The composition of claim 1 wherein said compound is $\alpha,\alpha'$-thio(3,5 - di-t-butyl - 2-hydroxyphenyl)-p-cresol.

11. The composition of claim 1 wherein said compound is $\alpha,\alpha'$-thio(3-nonyl-2-hydroxy-5-methylphenyl)-p-cresol.

12. The composition of claim 1 wherein said compound is $\alpha,\alpha'$-thio(3,5-dimethyl-2-hydroxyphenyl)-p-cresol.

13. The composition of claim 1 which contains from about 0.005 to about 5 weight percent of said compound based upon the weight of said ethylene polymer.

14. The composition of claim 1 which contains from about 0.01 to about 0.5 weight percent of said compound based upon the weight of said ethylene polymer.

15. The composition of claim 1 wherein said ethylene polymer comprises at least about 85% by weight of ethylene.

16. The composition of claim 14 wherein R is an alkyl radical containing 4 to 9 carbon atoms.

17. The composition of claim 14 wherein R is tert.butyl.

18. The composition of claim 14 wherein R is nonyl.

19. The composition of claim 14 wherein the $R_1$ substituent on the middle phenolic nuclei is methyl.

20. The composition of claim 14 wherein each $R_1$ is methyl.

21. The composition of claim 14 wherein said compound is $\alpha,\alpha'$-thio(3-t-butyl-2-hydroxy-5-methylphenyl)-p-cresol.

22. The composition of claim 14 wherein said compound is $\alpha,\alpha'$-thio(3,5 - di-t-butyl - 2-hydroxyphenyl)-p-cresol.

23. The composition of claim 14 wherein said compound is $\alpha,\alpha'$-thio(3 - nonyl-2-hydroxy-5-methylphenyl)-p-cresol.

24. The composition of claim 14 wherein said compound is $\alpha,\alpha'$-thio(3,5 - dimethyl - 2-hydroxyphenyl)-p-cresol.

25. The composition of claim 14 wherein $x$ is 1, R is an alkyl radical containing 4 to 9 carbon atoms, and wherein $R_1$ substituent on the middle phenolic nuclei is methyl.

26. The composition of claim 4 wherein $x$ is 1, and wherein $R_1$ substituent on the middle phenolic nuclei is methyl.

References Cited

UNITED STATES PATENTS

| | | | |
|---|---|---|---|
| 2,670,382 | 2/1954 | Downey et al. | 260—45.95 |
| 2,841,627 | 7/1958 | Beaver et al. | 260—45.95 |
| 3,057,926 | 10/1962 | Coffield et al. | 260—45.95 |
| 3,070,569 | 12/1962 | Rosenthal | 260—45.95 |
| 3,129,213 | 4/1964 | Worrel | 260—45.95 |
| 3,377,333 | 4/1968 | Ciesielski et al. | 260—609 F |
| 3,406,158 | 10/1968 | Brown et al. | 260—45.95 C |
| 3,647,885 | 3/1972 | Geering et al. | 260—45.95 C |

OTHER REFERENCES

ACS Meeting Div. Organic Coatings and Plastics Chemistry—21, No. 2, 1961, pp. 79 to 106.

DONALD E. CZAJA, Primary Examiner

E. C. RZUCIDLO, Assistant Examiner

U.S. Cl. X.R.

260—608, 609 F